(12) United States Patent
Zhang et al.

(10) Patent No.: US 10,724,398 B2
(45) Date of Patent: Jul. 28, 2020

(54) SYSTEM AND METHOD FOR CONDITION-BASED MONITORING OF A COMPRESSOR

(71) Applicant: General Electric Company, Schenectady, NY (US)

(72) Inventors: Hua Zhang, Greenville, SC (US); Bradly Kippel, Greenville, SC (US); David Trayhan, Greenville, SC (US); Iris Hu, Greenville, SC (US)

(73) Assignee: General Electric Company, Schenectady, NY (US)

( * ) Notice: Subject to any disclaimer, the term of this patent is extended or adjusted under 35 U.S.C. 154(b) by 990 days.

(21) Appl. No.: 15/263,024

(22) Filed: Sep. 12, 2016

(65) Prior Publication Data

US 2018/0073389 A1 Mar. 15, 2018

(51) Int. Cl.
*F01D 25/00* (2006.01)
*B01D 46/00* (2006.01)
(Continued)

(52) U.S. Cl.
CPC ......... *F01D 25/002* (2013.01); *B01D 46/008* (2013.01); *B01D 46/0086* (2013.01); *F01D 21/003* (2013.01); *F02C 7/055* (2013.01); *G01M 15/14* (2013.01); *B01D 2279/60* (2013.01); *F05D 2230/72* (2013.01);
(Continued)

(58) Field of Classification Search
CPC .......................... F05D 2207/71; F05D 2270/71
See application file for complete search history.

(56) References Cited

U.S. PATENT DOCUMENTS 8,475,115 B2 7/2013 Zhang et al.
8,747,533 B1 6/2014 Ekanayake et al.
(Continued)

FOREIGN PATENT DOCUMENTS

WO          2005/090764 A1     9/2005
WO    WO-2005090764 A1 *  9/2005    ........... F01D 25/002
(Continued)

OTHER PUBLICATIONS

Translation of WO 2005090764 A1, dated Sep. 29, 2005, by the USPTO (Year: 2005).*
(Continued)

*Primary Examiner* — Jennifer E Simmons
(74) *Attorney, Agent, or Firm* — Fletcher Yoder, P.C.

(57) ABSTRACT

In one embodiment, a turbine system includes a compressor, an intake section including a filter house and an inlet duct. The intake section is coupled to the compressor, and the filter house is upstream from the inlet duct. The turbine system also includes one or more sensors disposed in the intake section, and a processor configured to receive sensor data from the one or more sensors, one or more filter degradation rates for one or more filtration stages of the filter house, or some combination thereof, predict a compressor degradation rate for the compressor using a compressor degradation prediction model that provides a function of performance of the compressor based on the sensor data, the one or more filter degradation rates, or some combination thereof, and perform one or more preventative actions based on the compressor degradation rate prediction.

20 Claims, 5 Drawing Sheets

(51) Int. Cl.
*F01D 21/00* (2006.01)
*G01M 15/14* (2006.01)
*F02C 7/055* (2006.01)

(52) U.S. Cl.
CPC .... *F05D 2260/607* (2013.01); *F05D 2260/80* (2013.01); *F05D 2270/311* (2013.01); *F05D 2270/71* (2013.01); *F05D 2270/80* (2013.01)

(56) References Cited

U.S. PATENT DOCUMENTS

| | | | |
|---|---|---|---|
| 2007/0056271 A1 | 3/2007 | Berryhill et al. | |
| 2014/0202334 A1* | 7/2014 | Scipio | B01D 35/00 96/26 |
| 2018/0073386 A1 | 3/2018 | Zhang et al. | |

FOREIGN PATENT DOCUMENTS

| | | | |
|---|---|---|---|
| WO | 2013/127993 A1 | 9/2013 | |
| WO | WO-2016087302 A1 * | 6/2016 | ......... B01D 46/0086 |

OTHER PUBLICATIONS

Zhang, H., et al., "System and method for higher plant efficiency," GE Co-Pending U.S. Appl. No. 15/286,305, filed Oct. 5, 2016.

Zhang, H., et al., "Method and system for monitoring motor bearing condition," GE Co-Pending U.S. Appl. No. 15/333,331, filed Oct. 25, 2016.

Zhang, H., et al., "System and method for turbomachinery rotor and blade prognostics and diagnostics," GE Co-Pending U.S. Appl. No. 15/371,014, filed Dec. 6, 2016.

Extended European Search Report and Opinion issued in connection with corresponding EP Application No. 17189785.3 dated Jan. 22, 2018.

* cited by examiner

SYSTEM AND METHOD FOR CONDITION-BASED MONITORING OF A COMPRESSOR

BACKGROUND OF THE INVENTION

The subject matter disclosed herein relates to turbomachinery, and more particularly, to predicting degradation rates of components of turbomachinery using condition-based monitoring.

Turbomachine systems (e.g., turbine systems) may include a variety of components and subsystems participating in a process. For example, a turbomachine may include a load, a shaft, a filter house, fuel lines, combustors, turbine, exhaust systems, and so forth. The components and subsystems may operate in conjunction to produce work output by spinning the shaft that drives the load (e.g., electric generator). Over time, the components and subsystems may degrade from use, accumulation of substances, or the like. For example, filters in a filter house of a turbine system may degrade by accumulating dust, thereby causing a pressure drop in an inlet duct structure that is undesirable. In another example, the compressor of a turbine system may also degrade by accumulating dust, thereby affecting the output of the turbine system. Oftentimes, maintenance of the components and subsystems may be statically scheduled. However, following a static schedule may lead to inefficient resource usage by replacing a component before it has actually reached a degraded state that affects the performance of the turbine system. Likewise, following the static schedule to replace a component after it has already reached a degraded state may result in operating inefficiencies and other compressor operation issues, such as vibration and reduction in surge margin, in the turbine system.

BRIEF DESCRIPTION OF THE INVENTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a turbine system includes a compressor, an intake section including a filter house and an inlet duct. The intake section is coupled to the compressor, and the filter house is upstream from the inlet duct. The turbine system also includes one or more sensors disposed in the intake section, and a processor configured to receive sensor data from the one or more sensors, one or more filter degradation rates for one or more filtration stages of the filter house, or some combination thereof, predict a compressor degradation rate for the compressor using a compressor degradation prediction model that provides a function of performance of the compressor based on the sensor data, the one or more filter degradation rates, or some combination thereof, and perform one or more preventative actions based on the compressor degradation rate prediction.

In one embodiment, a computer-implemented method includes receiving one or more filter degradation rates for one or more filtration stages of a filter house in an intake section of a turbine system, sensor data from one or more sensors of the turbine system, or some combination thereof, predicting a compressor degradation rate for the compressor using a compressor degradation prediction model that provides a function of performance of the compressor based on the sensor data, the one or more filter degradation rates, or some combination thereof, and performing one or more preventative actions based on the compressor degradation rate prediction.

In one embodiment, one or more tangible, non-transitory, computer-readable media storing computer instructions that, when executed by one or more processors, cause the one or more processors to receive one or more filter degradation rates for one or more filtration stages of a filter house in an intake section of a turbine system, sensor data from one or more sensors of the turbine system, or some combination thereof, predict a compressor degradation rate for the compressor using a compressor degradation prediction model that provides a function of performance of the compressor based on the sensor data, the one or more filter degradation rates, or some combination thereof, and perform one or more preventative actions based on the compressor degradation rate prediction.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION OF THE INVENTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

As previously discussed, the performance and normal operations of a turbine system may be affected by the degradation of its components. For example, when one or more inlet filters load excess particles, the pressure of the inlet duct may drop to an undesirable level and filtration efficiency may decrease. An inefficient filter would result in more particles flow through it and reach compressor, thereby causing fouling of compressor blades and vanes. However, filter loading is quite different from site to site. For example, some sites that are located in environments with more precipitation may cause the inlet filters to be wetter and stickier, thereby loading particles more quickly than inlet filters in dryer climates. Likewise, inlet filters located in environments near a body of saltwater may load particles faster due to salt in the air accumulating on the filter as the air is drawn into the turbine system. Further, the particles that pass through the filter and enter the inlet duct may eventually land one or more blades of a compressor of the turbine system, thereby impacting the performance of the turbine system. Oftentimes, the compressor and/or the inlet filters are maintained or replaced based on a preset static schedule. However, such static schedule-based monitoring may be inefficient at least for the reasons discussed above.

Accordingly, some embodiments of the present disclosure relate to condition-based monitoring of components of the turbine system using degradation prediction logic. The degradation prediction logic may generate one or more models, such as a filter degradation prediction model and a compressor degradation prediction model. It should be understood that the models may improve the fidelity of their predictions based on measured data over time.

As noted above, filter degradation may result in an undesirable pressure drop that results in inefficient operation of the turbine system and decrease in filtration efficiency. Thus, the filter degradation prediction model may predict the degradation rate of the filter to perform one or more preventative actions. The filter degradation prediction model may receive inputs of performance data (e.g., testing data) related to longevity of one or more inlet filters in a number of filtration stages of a filter house when certain conditions are present, the actual conditions of the components from sensors, and/or local conditions of the environment in which the monitored turbine system is located. The filter degradation prediction model may output a prediction of the degradation rate of each filter in each filtration stage that can be used to determine the remaining useful life of the filters. The prediction may be used to perform one or more preventative actions, such as shutting down the turbine system, scheduling maintenance for or replacement of one or more of the filters, driving a self-cleaning system of the filters in the intake, and/or the like. Such preventative actions may reduce the likelihood of unexpected downtime for the turbine system and/or may improve the performance of the turbine system by reducing undesirable pressure drops in the inlet duct.

Also, as noted above, compressor degradation may result in inefficient operation of the turbine system, the reduction of surge margin, and excessive vibrations. Thus, the compressor degradation prediction model may predict the degradation rate of the compressor to perform one or more preventative actions. The compressor degradation prediction model may receive inputs of performance data (e.g., testing data) related to compressor health when certain conditions are present, the actual conditions of the components from sensors, local conditions of the environment in which the monitored turbine system is located, and/or one or more filter degradation rate predictions from the filter degradation prediction model. The compressor degradation prediction model may predict the compressor degradation rate. The compressor degradation rate prediction may be used to perform one or more preventative actions, such as scheduling online and/or offline water washes to clean the particles off the compressor, performing the scheduled water washes, shutting down the turbine system, repairing the compressor, replacing the compressor blades and/or vanes, and/or the like. Such preventative actions may reduce the likelihood of losing power output when the compressor is fouled with particles, among other things. It should be understood that the preventative actions disclosed herein are more dynamic in nature than mere static schedule-based monitoring with reactive actions because the preventative actions are based on the actual conditions of the components of the turbine system, historical performance data related to useful life of the components when certain conditions are present, and/or local conditions of the environment, among other things.

Figure 1:
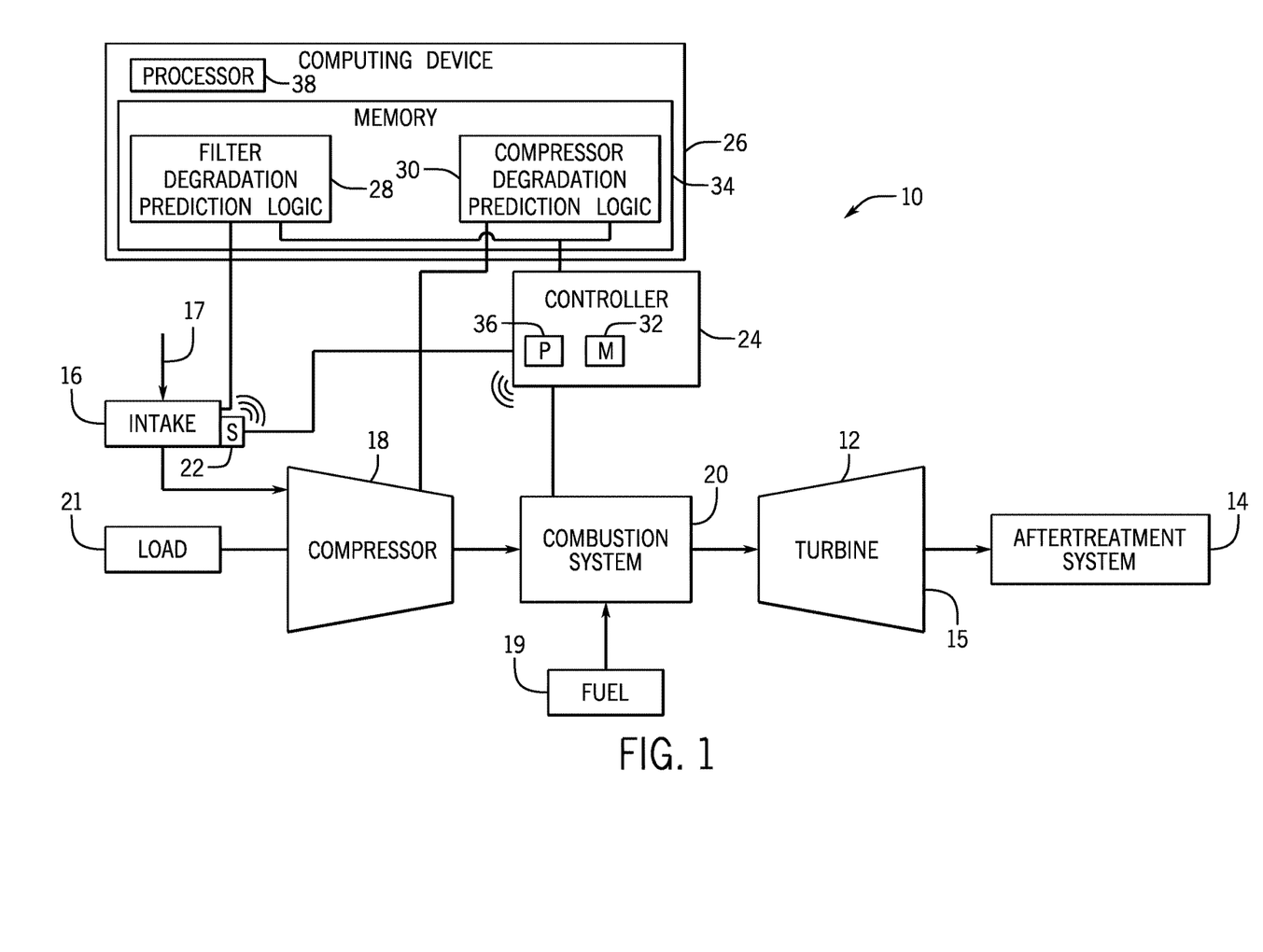
FIG. 1 is a block diagram of a turbine system that enables condition-based monitoring of one or more components of the turbine system, in accordance with an embodiment.

Turning now to the drawings, FIG. 1 is a block diagram of a turbine system 10 that enables condition-based monitoring of one or more components of the turbine system 10, in accordance with an embodiment. The turbine system 10 includes a turbine 12 and an aftertreatment system 14. In certain embodiments, the turbine system 10 may be a power generation system. The turbine system 10 may use liquid or gas fuel, such as natural gas and/or a hydrogen-rich synthetic gas, to run the turbine system 10. As shown, the turbine system 10 includes an air intake section 16, a compressor 18, a combustion system 20, and the turbine 12. The turbine 12 may be drivingly coupled to the compressor 18 via a shaft. In operation, air enters the turbine system 10 through the air intake section 16 (indicated by the arrows 17) and is pressurized in the compressor 18.

The air intake section 16 may include a filter house that includes a number of filtration stages of inlet filters. The inlet filters at each stage degrade (e.g., loaded with particles) at different paces or rates. For example, the inlet filters in a pre-filtration stage (e.g., the first inlet filters exposed to incoming air) may degrade the fastest, thereby having the shortest life, because more particles load onto these inlet filters than the subsequent inlet filters in later filtration stages. To that end, the inlet filters of the final filtration stage in the filter house may load with particles at the slowest rate, thereby having the longest life, as compared to inlet filters in preceding stages. Also, the inlet filters may degrade at different rates based on the environment in which they are located. For example, inlet filters located near a coast or body of saltwater may load particles more quickly and degrade faster than inlet filters that are inland. Also, inlet filters in humid climates or climates where precipitation is prevalent may degrade faster as the inlet filters become wet and sticky than dryer climates. As the inlet filters become loaded with particles, less air passes through the intake section 16, and a pressure drop may result in an inlet duct structure. The pressure drop may cause a reduced performance of the turbine system 10. Accordingly, some embodiments of the present disclosure enable predicting the degradation rate of the plurality of inlet filters in each filtration stage to enable determining the useful life of the inlet filters and performing one or more preventative actions (e.g., driving self-cleaning system, scheduling maintenance and/or replacement, etc.).

The compressor 18 may include a number of compressor blades coupled to the shaft. The rotation of the shaft causes rotation of the compressor blades, thereby drawing air into the compressor 18 and compressing the air prior to entry into the combustion system 20. The compressor blades may accumulate particles that pass through the filter house of the intake section 16 and degrade (e.g., become fouled). The amount of work output produced by the turbine system 10 may be impacted negatively as the compressor blades degradation worsens. Accordingly, some embodiments of the present disclosure enable predicting the degradation rate of the compressor 18 and performing one or more preventative actions (e.g., scheduling an online and/or offline water wash of the compressor 18) accordingly.

As compressed air 17 exits the compressor 18 and enters the combustion system 20, the compressed air 17 may be mixed with fuel 19 for combustion within one or more combustion cans. For example, the combustion cans may include one or more fuel nozzles that may inject a fuel-air mixture into the combustion cans in a suitable ratio for optimal combustion, emissions, fuel consumption, power output, and so forth. The combustion of the air 17 and fuel 19 generates hot pressurized exhaust gases, which may then be utilized to drive one or more turbine blades within the turbine 12. In operation, the combustion gases flowing into and through the turbine 12 flow against and between the turbine blades, thereby driving the turbine blades and, thus, the shaft into rotation to drive a load 21, such as an electrical generator in a power plant. As discussed above, the rotation of the shaft also causes blades within the compressor 18 to draw in and pressurize the air received by the intake 16.

The combustion gases that flow through the turbine 12 may exit the downstream end 15 of the turbine 12 as a stream of exhaust gas. The exhaust gas stream may continue to flow in the downstream direction towards the aftertreatment system 14. For instance, the downstream end 15 may be fluidly coupled to the aftertreatment system 14. As a result of the combustion process, the exhaust gas may include certain byproducts, such as nitrogen oxides ($NO_x$), sulfur oxides ($SO_x$), carbon oxides ($CO_x$), and unburned hydrocarbons. Due to certain regulations, the aftertreatment system 14 may be employed to reduce or substantially minimize the concentration of such byproducts prior to releasing the exhaust gas stream into the atmosphere.

One or more sensors 22 may be included in certain components of the turbine system 10. For example, in some embodiments, one or more sensors 22 may be included in the components of the intake section 16 (e.g., in the filter house, before the filter house, middle of the filter house, after the filter house), in an inlet duct downstream of the filter house but before a silencer, and/or downstream of the silencer. In some embodiments, the sensors 22 may include any type of pressure sensors, dust sensors (e.g., optical), temperature and humidity sensors, accelerometers, strain gauges, or the like. In some embodiments, the pressure sensors may be configured to sense pressure signals or waves in any desirable amplitude and frequency range in their respective locations. The sensors 22 may include piezoelectric materials that generate electric signals resulting from pressure. In some embodiments, the sensors 22 may include Micro-Electrico-Mechanical Systems (MEMs) sensors, Hall effect sensors, magnetorestrictive sensors, or any other sensor designed to sense vibration, pressure, or the like. In some embodiments, the sensors 22 may include a microphone or array of microphones included in the intake section 16. In some embodiments, the microphone or array of microphones may send detected sound indicative of filter house general health (e.g., filter house structural integrity) to the controller 24.

Additionally, the dust sensors may include optical sensors that are configured to provide an indication of air quality in an environment by measuring dust concentration, type, and/or size optically. The sensors 22 may include communication circuitry that enables the sensors 22 to be communicatively coupled to a controller 24 and/or a computing device 26 via a wireless (e.g., Bluetooth® Low Energy, ZigBee®, WiFi®) or wired connection (e.g., Ethernet). In some embodiments, the computing device 26 may include a laptop, a smartphone, a tablet, a personal computer, a human-machine interface, or the like.

The sensors 22 may transmit signals indicative of pressure (e.g., static, dynamic), dust particle properties (e.g., concentration, type, size), temperature, humidity, or the like to the controller 24 and/or the computing device 26. The controller 24 and/or the computing device 26 may receive measurements based on the signals as parameters in filter degradation prediction logic 28 and/or compressor degradation prediction logic 30. As such, the controller 24 and/or the computing device 26 may each include one or more tangible, non-transitory computer-readable media (e.g., memories 32 and 34) that store computer instructions that implement the filter degradation prediction logic 28 and/or the compressor degradation prediction logic 30. Although the filter degradation prediction logic 28 and the compressor degradation prediction logic 30 are shown as stored on the memory 34 of the computing device 26, it should be understood that, in some embodiments, either or both of the prediction logics 28 and 30 may be also stored on the memory 32 of the controller 24 or either or both of the prediction logics 28 and 30 may just be stored on the memory 32 of the controller 24. Further, the controller 24 and/or the computing device 26 may include communication circuitry, such as a network interface, that is configured to receive the signals and transmit them to the processors 36 and 38.

The processors 36 and 38 may be any type of computer processor or microprocessor capable of executing computer-executable code. Moreover, the processors 36 and 38 may include multiple processors or microprocessors, one or more "general-purpose" processors or microprocessors, one or more special-purpose processors or microprocessors, and/or one or more application specific integrated circuits (ASICS), or some combination thereof.

The memories 32 and 34 may be any suitable articles of manufacture that can serve as media to store processor-executable instructions, code, data, or the like. These articles of manufacture may represent computer-readable media (e.g., any suitable form of memory or storage) that may store the processor-executable code or routines used by the respective processors 36 and 38 to perform the presently disclosed techniques. For example, the memories 32 and 34 may include volatile memory (e.g., a random access memory (RAM)), nonvolatile memory (e.g., a read-only memory (ROM)), flash memory, a hard drive, or any other suitable optical, magnetic, or solid-state storage medium, or a combination thereof. The memories 32 and 34 may also be used to store any data (e.g., performance data, sensor data, local conditions of the environment in which the turbine system 10 is located, degradation rate predictions, schedules of maintenance, and/or repairs), analysis of the data, the filter degradation prediction logic 28, the compressor degradation prediction logic 30, and the like.

Generally, the processors 36 and/or 38 may execute the filter degradation prediction logic 28 and/or the compressor degradation prediction logic 30 that may determine degradation rates of the inlet filters and the compressor 18, respectively, and perform one or more preventative actions.

The filter degradation prediction logic 28 and the compressor degradation prediction logic 30 may both generate models (e.g., physics-based, mathematical) to predict the degradation rates of the respective filter and compressor 18. To determine the degradation rate predictions, the models may consider one or more parameters.

In some embodiments, the parameters may be weighted differently such that some of the parameters have a more significant impact on the prediction than other parameters. For example, in one embodiment, the particle size of dust entering an inlet duct 42 and/or the humidity before the filter house may be weighted more heavily than the ambient temperature. The one or more parameters may include pressure obtained by sensors 22 before the filter, pressure in the filter, pressure downstream of the filter before and after a silencer, ambient temperature and relative humidity before the filter, temperature and relative humidity before inlets of the compressor 18, dust particle distribution (e.g., particle size, type, amount) before and after the filter, a filter degradation (e.g., loading) rate testing lab model, local conditions (e.g., location of the turbine system 10, typical type of particle chemical composition, weather forecasting data), turbine system 10 operation modes, load and efficiency of the turbine system 10, inlet bleed heat on/off, power augmentation measures (e.g., wet compression, fogging, evaporative cooling, chilling), compressor blade fouling rate as related to particle loading (e.g., size, type, amount), operating hours of the turbine system 10, and the like. These parameters may each impact filter degradation and some, when present with others, may have a compounding effect. Accordingly, the model may determine likely degradation based upon these parameters individually and as a whole.

In some embodiments, the models may operate in real-time while the turbine system 10 is operating. Additionally or alternatively, the models may operate while the turbine system 10 is offline or shutdown using stored sensor data (e.g., from the last time the turbine system 10 was operational). The models may be adaptive in that they update parameters of the models based on new data (e.g., from dust sensors 22, pressure sensors 22, temperature and humidity sensors 22, turbine system power output and efficiency, etc.). For example, signals that include measurements from the sensors 22 may cycle through the computing device 26 and/or the controller 24 while the turbine system 10 is operating to enable the adaptive ability of the models. The signals may be sent on a periodic basis, on-demand, when a measurement changes, or the like. The models may continue to improve in fidelity as operation of the turbine system 10 continues and additional sensor data is accumulated and processed. Further, sensor data at a later time may be used to validate the model prediction. That is, if a model predicts a filter will be degraded in 30 operating hours, then pressure sensor data may be read in 30 hours to determine whether the model was accurate. If not, the model may be adjusted accordingly.

Because each turbine system 10 may be located in different physical sites, the degradation rates of the components of the turbine systems 10 may vary due to varying local conditions. For example, a filter in a site near the coast may degrade faster than a filter in an inland site due to salt in the air. Additionally, a filter in a site near a construction site or a desert may also degrade faster than a filter in a site away from a construction site or a desert due to excess dust particles in the air near a construction site or in a desert. Also, a filter in a site located where there is a lot of humidity may load particles faster, and thereby degrade faster than filters in non-humid climates. Accordingly, the filter degradation prediction logic 28 and the compressor degradation prediction logic 30 may be individually tailored for each turbine system 10 based on the sensor data and local conditions of each respective turbine system 10.

However, in some embodiments, a cloud-based system may perform analytics on data shared by the turbine systems 10. For example, the cloud-based system may receive sensor data and local conditions from each turbine system 10 and degradation rates that have been validated based on the sensor data and the local conditions. The cloud-based system may enable improving the fidelity of the models by sending the validated degradation rates associated with the sensor data and the local conditions. That is, the degradation rates predicted by the filter degradation prediction logic 28 and the compressor degradation prediction logic 30 may be improved using the cloud-based system based on other validated degradation rates from other turbine systems 10 with similar sensor data and local conditions. In this way, the cloud-based system may function as a central repository for certain data (e.g., test lab data, sensor data, local conditions data, degradation rates) and as a central processing system in communication with the various computing devices 26 and/or the controllers 24 executing the filter degradation prediction logic 28 and/or the compressor degradation prediction logic 30.

In some embodiments, the computing device 26 and/or the controller 24 may include a display. The display may be used to display various graphical elements, such as a virtual barometer of filter life remaining based on the predicted filter degradation rate or the like. Additionally, the display may be used to display the predicted filter degradation rate, predicted compressor degradation rate, and/or the results of the one or more preventative actions (e.g., water wash schedule for the compressor based on the predicted compressor degradation rate, scheduled maintenance and/or replacement of filter based on the predicted filter degradation rate, etc.).

Figure 2:
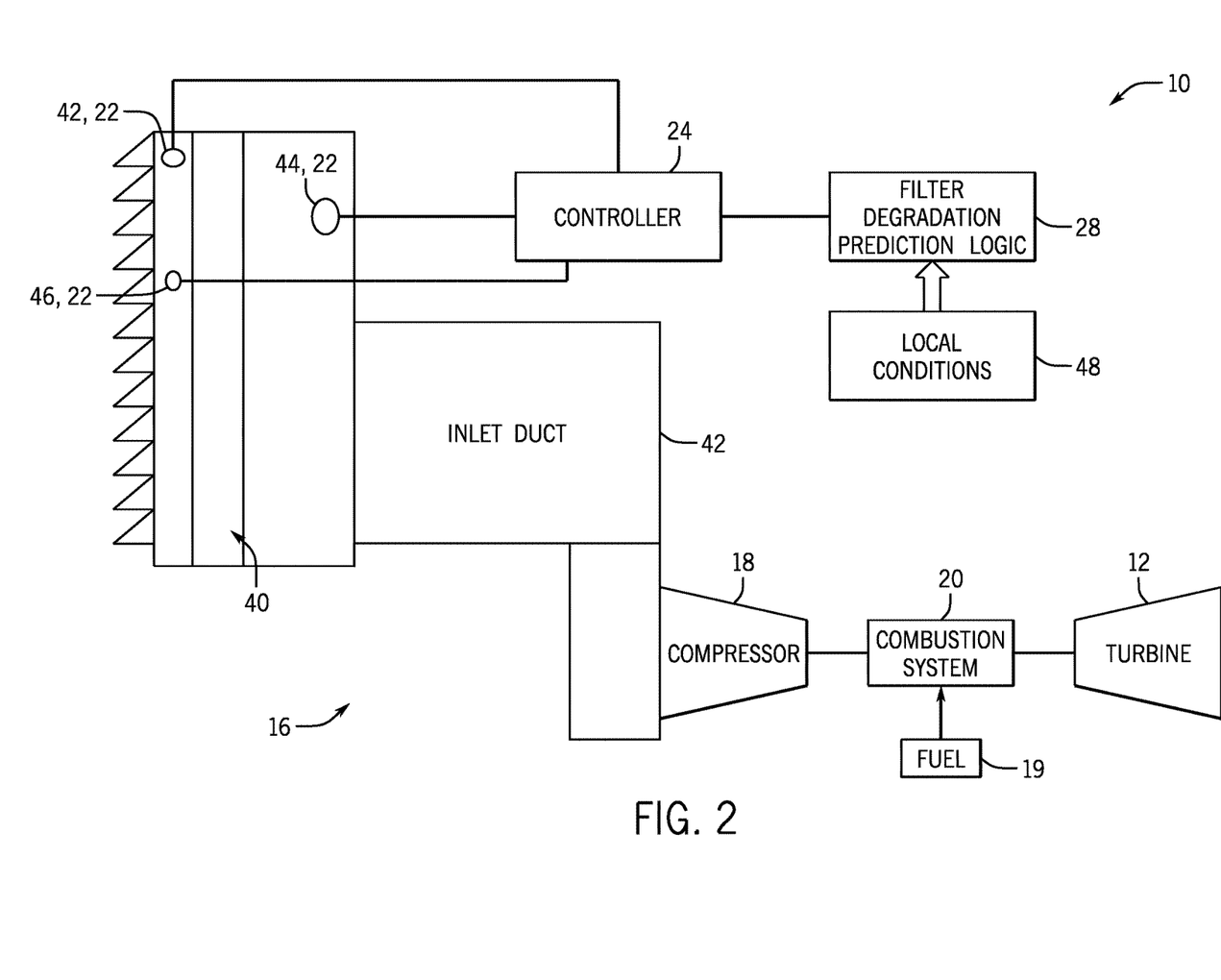
FIG. 2 is a block diagram of the turbine system of FIG. 1 including filter degradation prediction logic receiving various inputs, in accordance with an embodiment.

FIG. 2 is a block diagram of the turbine system 10 of FIG. 1 including the filter degradation prediction logic 28 receiving various inputs, in accordance with an embodiment. As depicted, the intake section 16 of the turbine system 10 includes a filter house 40 and an inlet duct 42. The structure of the inlet duct 42 may be designed to take a certain level of negative pressure before the performance of the turbine system 10 suffers. The pressure in the inlet duct 42 may drop when the filter house 40 degrades by particles loading on one or more filters in one or more filtration stages in the filter house 40. Accordingly, the filter degradation prediction logic 28 may determine the useful life of the filters in each of the one or more filtration stages by predicting the degradation rate based on various inputs using a filter degradation prediction model.

In particular, the inputs may include performance data that is derived using a filter loading rate testing lab model. The performance data and/or the filter loading rate testing lab model may be stored on the memory 34 of the computing device 26, retrieved from the memory 32 of the controller 24, retrieved from the cloud-based system, retrieved from an external server, or the like. The filter loading rate testing lab model may model the loading rate of the filters over time based on certain measured sensor data (e.g., dust, pressure, temperature, humidity) acquired during testing of the turbine system 10. In some embodiments, the filter degradation prediction logic 28 may use the performance data to initialize the filter degradation prediction model.

The inputs may also include sensor data from one or more dust sensors 42, 22 and sensor data from one or more pressure sensors 44, 22. As depicted, the dust sensor 42, 22 may be located in front of (e.g., upstream) the filter house 40 and configured to measure dust particles (e.g., size, type, concentration) in the air entering the filter house 40. The concentration of dust particles may provide an indicator that the particles will load on the filters faster. Also, larger dust particles may be more likely to get filtered by the filters, but the smaller dust particles may cause the loading rate to increase faster. In addition, certain types of dust particles are more likely to load on the filters due to properties that cause the particles to be stickier, wetter, or the like.

Further, although the pressure sensor 44, 22 is depicted as located downstream of the filter house 40, in some embodiments, the pressure sensor 44, 22, or additional pressure sensors 44, 22, may be located in front of the filter house 40, inside the filter house 40, and/or downstream of the filter house 40 after a silencer. It should be noted that more than one dust sensor 42, 22 and/or pressure sensor 44, 22 may be used in certain embodiments.

In some embodiments, the inputs may also include temperature and humidity data from one or more temperature and humidity sensors 46, 22 in front of (e.g., upstream) the filter house 40. As may be appreciated, high humidity may be an indicator that the filters may load particles faster because the humidity may cause the filters to become moist and sticky. Further, high temperature may change the particle surface properties, thereby reducing the chance that particles load on the filters.

The dust sensor 42, 22, the pressure sensor 44, 22, and/or the temperature and humidity sensors 46, 22 may be communicatively coupled to the controller 24 and may be configured to send signals indicative of measured dust particles, pressure, temperature, and humidity, to the controller 24. In some embodiments, the processor 28 of the computing device 26 executing the filter degradation prediction logic 28 may receive the dust sensor data, the pressure sensor data, and/or the temperature and humidity sensor data from the controller 24. In some embodiments, the dust sensor 42, 22, the pressure sensor 44, 22, and/or the temperature and humidity sensor 46, 22 may be wirelessly coupled directly with the computing device 26 executing the filter degradation prediction logic 28.

In addition, the inputs may also include local conditions data 48. The local conditions data 48 may include location of the site in which the turbine system 10 is located. For example, the location may indicate that the site is near a coast or is inland. As discussed above, filters in sites near coasts (or other areas having high salt concentrations) may load at faster rates due to the salt in the air from the nearby water. Further, the location may indicate that the site is near a construction site where the air may include dust, dirt, debris, and the like from the construction that may cause the filters to load faster. The local conditions data 48 may also include the typical type of particle chemical composition found in the environment in which the site is located. The local conditions data 48 may also include weather forecasting data for the area in which the site is located. Accordingly, the local conditions data 48 may be received from a weather service or external server. The weather forecasting data may indicate ambient temperature, ambient pressure, relative humidity level, sand storm level, chance of precipitation or storm, and the like. Such weather indications may enable the filter degradation prediction logic 28 to tailor the filter degradation prediction model to account for certain weather conditions that cause loading of particles to increase or decrease.

As the turbine system 10 operates, the filter degradation prediction logic 28 may update the filter degradation prediction model with sensor data measured from the sensors 22 of the turbine system and/or changing local conditions data 48. That is, historical data (e.g., pressures, humidity, temperature, dust, etc.) may be sent from the sensors 22 to the filter degradation prediction logic 28 to determine whether the filter degradation prediction model is accurate. Accordingly, the filter degradation prediction logic 28 may update the filter degradation prediction model in real-time or near real-time based on changed conditions of the turbine system 10 and/or the local conditions. Further, the filter degradation prediction logic 28 may use subsequently obtained sensor data to determine whether the filter degradation prediction model is accurate. As a result, the filter degradation prediction model may improve the fidelity of its prediction based on measured data (e.g., sensor and/or local conditions) over time. The filter degradation prediction model may output the predicted degradation rate and/or perform a preventative action based on the degradation rate.

Figure 3:
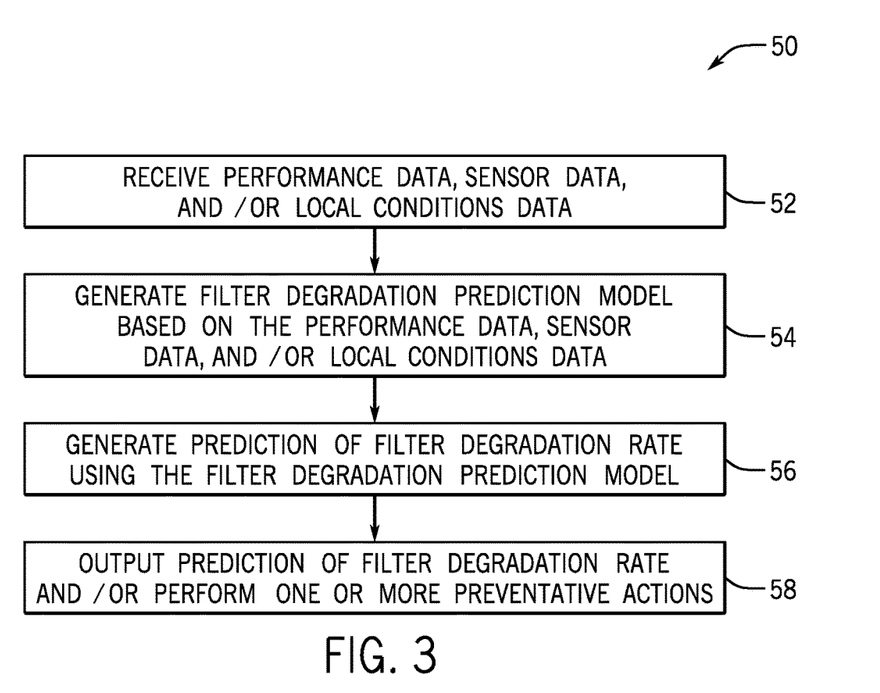
FIG. 3 is a flow diagram of a process suitable for predicting filter degradation rates using a filter degradation prediction model.

FIG. 3 is a flow diagram of a process 50 suitable for predicting one or more filter degradation rates using a filter degradation prediction model. Although the following description of the process 50 is described with reference to the processor 38 of the computing device 26, it should be noted that the process 50 may be performed by other processors disposed on other devices, such as the controller 24, a cloud-based system, or the like. Additionally, although the following process 50 describes a number of operations that may be performed, it should be noted that the process 50 may be performed in a variety of suitable orders and all of the operations may not be performed. It should be appreciated that the process 50 may be wholly executed by the computing device 26 or the execution may be distributed between the computing device 26 and/or the controller 24.

Referring now to the process 50, a processor (e.g., the processor 38 of FIG. 1) may receive (block 52) performance data, sensor data, and/or local conditions data 48. As previously discussed, the performance data may be derived from a filter loading rate testing lab model based on sensor data obtained during testing. The sensor data may include dust particle data (e.g., type, size, concentration) upstream and downstream of the filter house 40. The sensor data may also include pressure data upstream of the filter house 40, in the filter house 40, downstream of the filter house 40 but before a silencer, and downstream of the silencer. Also, the sensor data may include the ambient temperature and relative humidity upstream of the filter house 40.

The processor 38 may generate (block 54) a filter degradation prediction model based on the performance data, the sensor data, and/or the local conditions data 48. In some embodiments, the processor 38 may use the performance data to initialize the filter degradation prediction model. For example, the historical data of a filter and its function with regard to various parameters (e.g., high particle accumulation in damp areas, etc.) may be determined.

Further, the processor 38 may generate (block 56) a prediction of the degradation rate of each filter in each filtration stage of the filter house 40 using the filter degradation prediction model. That is, a degradation rate for the filters in each filtration stage of the filter house 40 may be determined, and the monitored data (e.g., pressure, temperature, humidity, dust particles, local conditions) may be tracked over time and recorded in the memory 34. In some embodiments, the processor 38 may use the degradation rates to predict the remaining useful life of each filter in each filtration stage of the filter house 40. The operational hours of the turbine system 10 may also be tracked and recorded in the memory 34. For example, the processor 38 may predict that the filters in a first filtration stage immediately exposed to the incoming air have a degradation rate that results in a remaining useful life of thirty hours, the filters in a middle filtration stage have a degradation rate that results in a remaining useful life of thirty-five hours, and the filters in a final filtration stage have a degradation rate that results in a remaining useful life of forty-eight hours.

Because the measured data and operational hours are tracked, the predicted degradation rates may be validated by the processor 38. To illustrate, the processor 38 may use the filter degradation prediction model to predict that the filter of a certain filtration stage will load particles at a rate (e.g., degradation rate) that may cause a pressure drop in the inlet duct 42 below a threshold amount in thirty hours. When the thirty hours have been reached, a pressure sensor may read the pressure in the inlet duct 42 to determine whether the model predicted the pressure drop accurately based on the degradation rate. In this way, the predictions of the filter degradation prediction model may be validated. Over time, the fidelity of the predictions based on measured sensor data and/or local conditions may improve.

Further, the processor 38 may output (block 58) the prediction of the filter degradation rate and/or perform one or more preventative actions based on the predicted filter degradation rates. As previously discussed, the filter life may be ascertained based on the predicted degradation rates. The degradation rates and/or the useful life may be displayed as a virtual barometer or as any suitable graphical element.

Also, the preventative actions may vary in relation to the degradation rates. For example, if the degradation rates are particularly high and the remaining useful life of the filter is nearly expired, the processor 38 may shut down the turbine system 10 so maintenance and/or replacement of the degraded filter may be performed as soon as possible. In some embodiments, the preventative actions may include scheduling maintenance and/or replacement of the degrading filter. Some turbine systems 10 may include self-cleaning systems in the intake section 16. A self-cleaning system may pulse air at a high velocity in a direction opposite to the direction air flows into the intake section 16 during operation to attempt to blow particles off of the filters in the filter house 40. The self-cleaning system may be scheduled as a form of maintenance for a preventative action. Accordingly, the self-cleaning system may be driven based on the sensor data (e.g., pressure, dust) and/or local conditions (e.g., humidity, temperature) instead of by just a pressure drop measurement.

Further, because the processor 38 may use the filter degradation prediction model to predict the degradation rate for each filter in each filtration stage of the filter house 40, the preventative actions may include determining a schedule of maintenance operations and/or replacement operations for the filters in the filtration stages. For example, a filter in a stage that is exposed to the highest amount of dust particles may have a relatively short life remaining based on the predicted degradation rate and a first date may be scheduled to perform maintenance and/or replace the filter. A filter in a second stage (e.g., last stage) that is exposed to the least amount of dust particles may have a relatively long life left based on the predicted degradation rate and a second date that is later than the first date may be scheduled to perform maintenance and/or replace the filter. The scheduling may be implemented such that the life of the final filter in the last filtration stage is enhanced (e.g., maximized) by optimizing the replacement and/or maintenance of the various other filtration stages in the filter house 40.

In some instances, the turbine system 10 may be shutdown to replace or maintain the filter in the final stage of the filter house 40. Thus, extending the life of the final filtration stage by optimizing the replacement and/or maintenance of the various other filtration stages may improve uptime of the turbine system 10. Moreover, the processor 38 may drive the execution of the self-cleaning system by stage, area, or zone of the filter house 40 instead of in the same order every time. Additionally or alternatively, the self-cleaning system may be executed in a preset order.

The processor 38 may continue to receive performance data, sensor data, and/or local conditions data 48 while the turbine system 10 is operational and use the received data to update the filter degradation prediction model. In this way, the filter degradation prediction model is adaptive to changing conditions of the turbine system 10 and the local conditions of the environment surrounding the turbine system 10. As may be appreciated, the disclosed techniques may enable better filter maintenance and/or replacement scheduling at a more granular level (e.g., by filtration stage). Also, the disclosed techniques may enable preventative maintenance. In addition, the disclosed techniques may provide higher turbine system reliability by maintaining and/or replacing degraded filters before undesirable pressure drops occur in the inlet duct 42.

Figure 4:
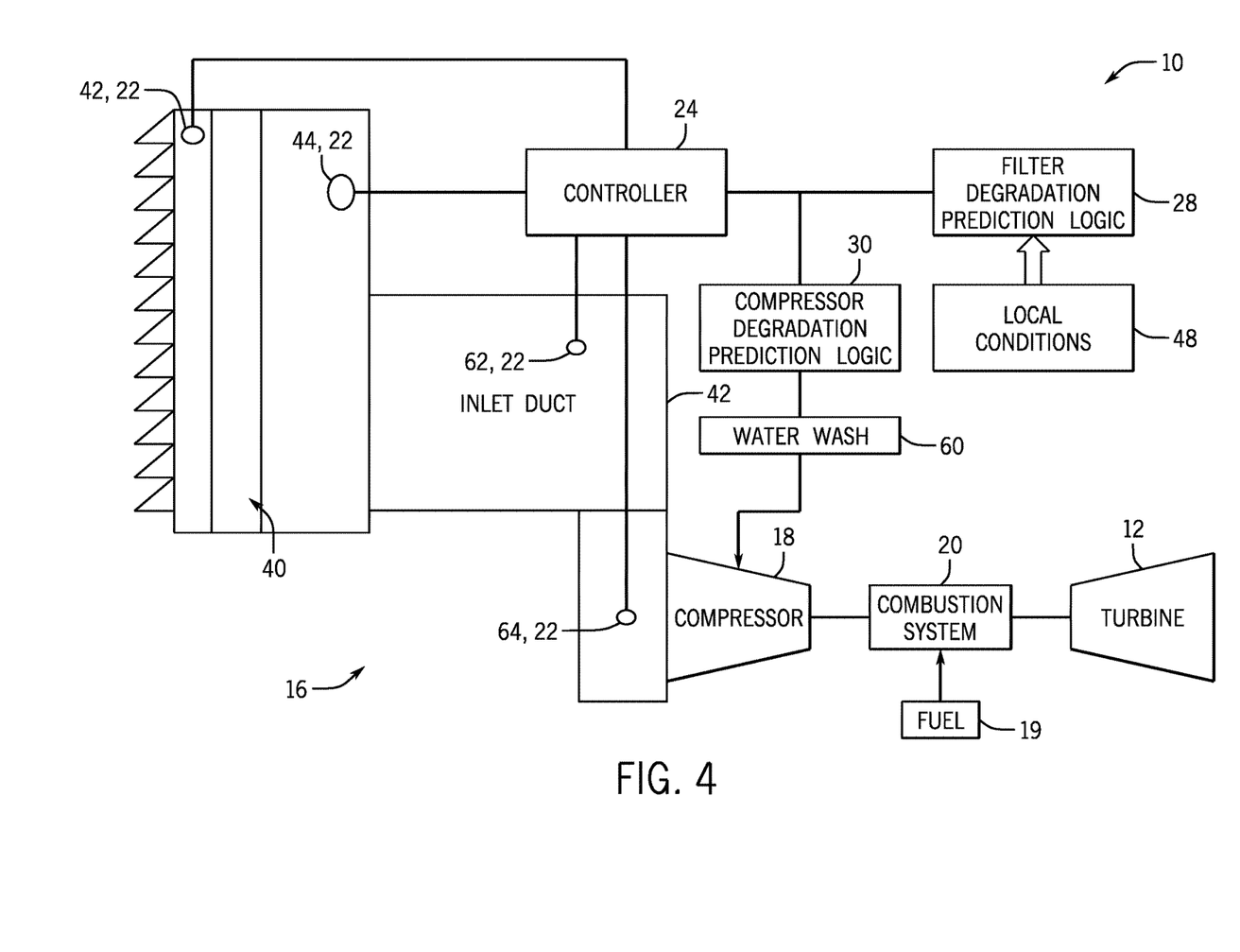
FIG. 4 is a block diagram of the turbine system of FIG. 1 including compressor degradation prediction logic and filter degradation prediction logic receiving various inputs, in accordance with an embodiment.

In addition, compressor degradation prediction logic 30 may be used in conjunction with the filter degradation prediction logic 28 to predict the degradation rate of the compressor 18. Accordingly, FIG. 4 is a block diagram of the turbine system 10 of FIG. 1 including the compressor degradation prediction logic 30 and the filter degradation prediction logic 28 receiving various inputs, in accordance with an embodiment. The turbine system 10 illustrated in FIG. 4 contains many similar components as FIGS. 1 and 2 including the intake section 16 (e.g., the filter house 40, inlet duct 42), compressor 18, combustion system 20, turbine 12, controller 24, filter degradation prediction logic 28, and so forth. However, FIG. 4 also includes a water wash component 60 and the compressor degradation prediction logic 30. It should be noted that, in some embodiments, the filter degradation prediction logic 28 and the compressor degradation prediction logic 30 may be stored on the memory 34 and executed by the processor 38 of the computing device 26. Additionally or alternatively, either or both of the filter degradation prediction logic 28 and the compressor degradation prediction logic 30 may be stored on the memory 32 and executed by the processor 36 of the controller 34.

As may be appreciated, the performance of compressors 18 may degrade when particles are loaded on the blades of the compressors 18 and the blades become fouled. The water wash component 60 functions to wash off the particles and clean the compressor 18. There are two varieties of water wash: online and offline. The online water wash may be performed when relatively light fouling is present or an early stage of compressor blades are fouled. Online water washes may be performed while the turbine system 10 is operating. Offline water washes may be performed when there is substantial or relatively high fouling present or a late stage compressor blade is fouled. Offline water washes may be performed when the turbine system 10 is shutdown.

Some of the present embodiments enable monitoring the actual fouling condition of the various compressor stages and predicting the degradation rate of the compressor 18 using the compressor degradation prediction logic 30. The compressor degradation prediction logic may generate a compressor degradation prediction model to predict the compressor degradation rate. The compressor degradation prediction model may be a model (e.g., physics-based mathematical model) that provides a compressor function that includes one or more weighted parameters, as discussed above.

The compressor degradation prediction model may receive one or more inputs, such as the output from the filter degradation prediction model of the filter degradation prediction logic 28. That is, the compressor degradation prediction model may account for the predicted degradation rates of the one or more filters in the filtration stages of the filter house 40. Thus, because the filter degradation prediction logic 28 includes local conditions data 48 in its prediction of the filter degradation rate, the compressor degradation prediction model also accounts for the local conditions data 48 in its prediction of the compressor degradation rate.

Additional inputs to the compressor degradation prediction model may include sensor data, such as data from the dust sensor 44, 22, dust sensor 62, 22, the pressure sensor 44, 22, and/or the temperature and humidity sensor 46, 22. As depicted, the dust sensor 44, 22 is located upstream of the filter house 40 and the dust sensor 62, 22 is located downstream of the filter house in the inlet duct 62, 22. Accordingly, the processor 38 may track data related to the dust particles entering the intake section 16, such as the concentration, type, and/or size of particles that pass through the filter house 40 and enter the inlet duct 42. In some embodiments, the processor 38 may determine a trend of the dust particle data over time by analyzing historical measurements.

Further, although the pressure sensor 44, 22 is depicted as located downstream of the filter house 40, in some embodiments, the pressure sensor 44, 22, or additional pressure sensors 44, 22, may be located in front of the filter house 40, inside the filter house 40, and/or downstream of the filter house 40 after a silencer. It should be noted that additional or fewer dust sensors and/or pressure sensor may be used in certain embodiments and may be located in different places than depicted in FIG. 4.

In some embodiments, the inputs may also include temperature and humidity data from one or more temperature and humidity sensors 64, 22 in front of (e.g., upstream) the compressor 18. The temperature and humidity sensors 64, 22 may obtain the temperature and relative humidity before the compressor inlets. As may be appreciated, high humidity may be an indicator that the compressor blades may load particles faster because the humidity may cause the blades and/or particles to become moist and sticky. Further, high temperature may change the particle surface properties, thereby reducing the chance that particles load on the blades. Further, the inputs may include the turbine operation modes, the load and efficiency of the turbine system 10 (e.g., mass flow rate), inlet bleed heat on/off, power augmentation measures, such as wet compression, fogging, evaporative chilling, and the like.

Based on the predicted degradation rate of the filters from the filter degradation prediction model, the trending dust particle data (e.g., particle size, amount, and/or type), the humidity, temperature, and/or turbine mass flow rate, the compressor degradation prediction model may output a degradation rate for the compressor 18. The degradation rate may be akin to the rate at which the compressor becomes fouled by loading particles. Using the compressor degradation rate, one or more preventative actions may be performed, as described in detail below.

Figure 5:
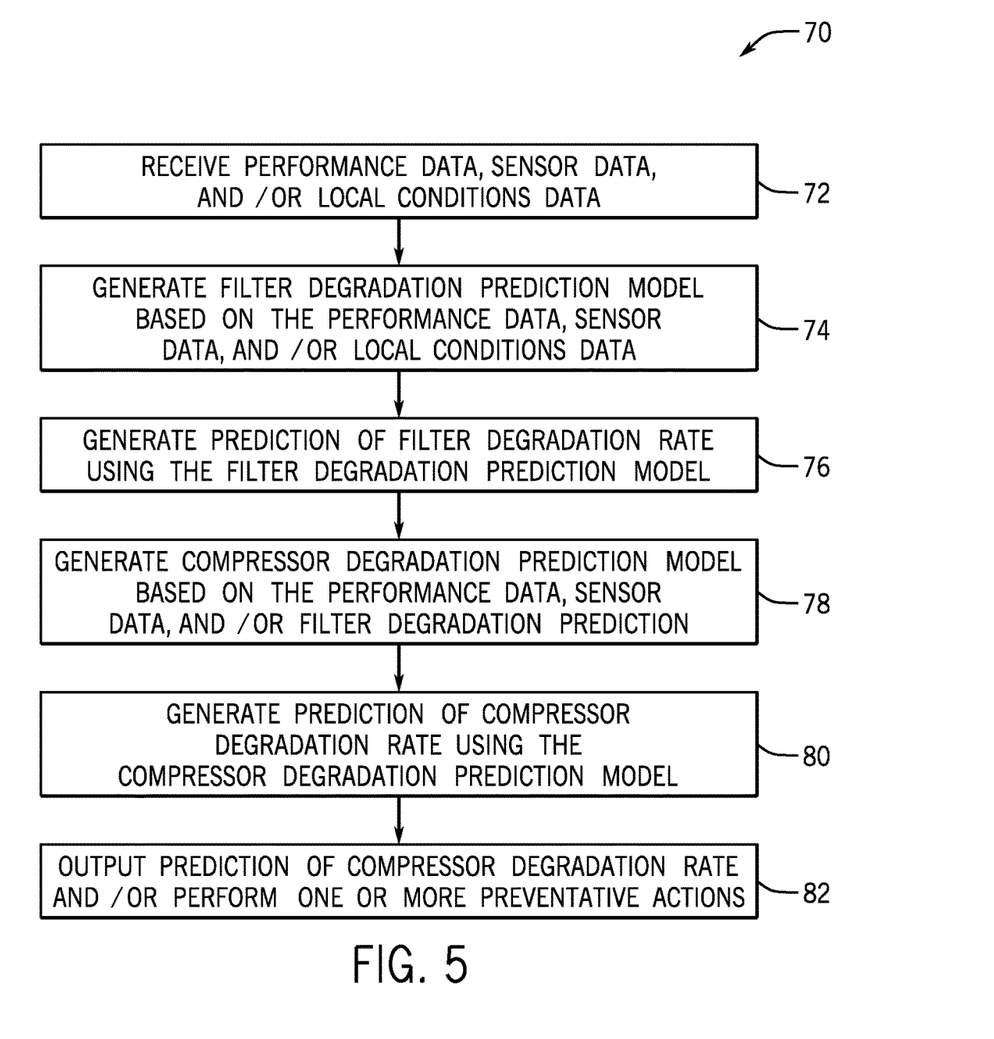
FIG. 5 is a flow diagram of a process suitable for predicting a compressor degradation rate, in accordance with an embodiment.

FIG. 5 is a flow diagram of a process 70 suitable for predicting a compressor degradation rate, in accordance with an embodiment. Although the following description of the process 70 is described with reference to the processor 38 of the computing device 26, it should be noted that the process 70 may be performed by other processors disposed on other devices, such as the processor 36 of the controller 24. Additionally, although the following process 70 describes a number of operations that may be performed, it should be noted that the process 70 may be performed in a variety of suitable orders and all of the operations may not be performed. It should be appreciated that the process 70 may be wholly executed by the computing device 26 or the execution may be distributed between the computing device 26 and/or the controller 24.

Referring now to the process 70, blocks 72, 74, and 76 are similar to blocks 52, 54, and 56 of the process 50 in FIG. 3. That is, the processor 38 may receive (block 72) performance data, sensor data, and/or local conditions data 48, generate (block 74) a filter degradation prediction model based on the performance data, sensor data, and/or local conditions data 48, and generate (block 76) one or more filter degradation rate predictions using the filter degradation prediction model. Such steps may be implemented as computer instructions included in the filter degradation prediction logic 28.

The process 70 in FIG. 5 also includes additional steps related to predicting the compressor degradation rate that may be implemented as computer instructions included in the compressor degradation prediction logic 30. For example, the processor 38 may generate (block 78) a compressor degradation rate model based on the performance data, sensor data, and/or the filter degradation rate. In some embodiments, during initialization, the processor 38 may use the performance data (e.g., pressure, dust particles, temperature, humidity) obtained from sensor measurements during testing to generate the compressor degradation prediction logic 30. Additionally, in some embodiments, sensor data obtained while the turbine system 10 is operational may be used to generate the compressor degradation prediction model. For example, trending dust particle data may be used. The trending dust particle data may show historical changes in the concentration, type, and/or size of dust particles that pass through the filter house 40 and enter the inlet duct 42 over time. Also, other sensor data may be accounted for in the compressor degradation prediction model, such as the temperature and relative humidity before the compressor inlets, and/or mass flow rate. In some embodiments, the local conditions data 48 may be accounted for in the compressor degradation prediction model.

The processor 38 may also generate (block 80) a prediction of the compressor degradation rate using the compressor degradation rate model. The processor 38 may output (block 82) the predicted compressor degradation rate and/or perform one or more preventative actions based on the predicted compressor degradation rate. For example, the processor 38 may ascertain a remaining useful life of the compressor 18 based on the predicted compressor degradation rate. The processor 38 may display the predicted degradation rate and/or the remaining useful life of the compressor 18 using one or more graphical elements (e.g., graph, gauge, and/or chart).

The one or more preventative actions may include scheduling online and/or offline water washes, performing the schedule of online and/or offline water washes, shutting down the turbine system 10, scheduling maintenance and repair/replace of the compressor blades and vanes 18, or the like. For example, the processor 38 may initiate water washes to optimize the compressor degradation rate based on the filter degradation prediction model, which changes output as the filters load with particles. That is, the water washes may be dynamically scheduled by monitoring the conditions (e.g., trending dust particle data) within the turbine system 10 and/or based on the filter degradation rate predictions. The water washes may be based on the type, concentration, and/or size of the particles ingested into the intake section 16 instantaneously (e.g., in real-time) as the turbine system 10 operates. The processor 38 may schedule online water washes more frequently when a less substantial amount of dust particles are loaded on stages of the compressor blades near the compressor inlet. The processor 38 may schedule an offline water wash when it is determined that a deeper clean is desired for blades in later stages in the compressor 18 or a more substantial amount of dust particles have loaded on the blades of the compressor 18. Accordingly, the processor 38 may also schedule a time to shut down the turbine system 18 so the offline water wash can be performed.

Technical effects of the invention include enabling condition based monitoring of filters in the filter house 40 and the compressor 18. In particular, one or more filter degradation rates may be predicted for filters in filtration stages of a filter house using a filter degradation prediction model based on performance data, sensor data, and/or local conditions data. Based on the filter degradation rate predictions, one or more preventative actions may be performed, such as controlling a self-cleaning system, scheduling maintenance and/or replacement, shutting down the turbine system 10, among others. Also, the compressor degradation rate may be predicted using a compressor degradation prediction model based on performance data, sensor data, and/or the predicted filter degradation rates output by the filter degradation prediction model. Based on the compressor degradation rate, one or more preventative actions may be performed, such as scheduling online and/or offline water washes in some optimal way to reduce the amount of turbine system 10 downtime, scheduling maintenance and/or replacement of the compressor 18, and/or shutting down the turbine system 10, among other things. As such, the disclosed embodiments have the effect of enhancing maintenance scheduling and turbine system efficiency, enabling preventative maintenance, and reducing downtime of the turbine system 10 (e.g., higher reliability), among other things.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A turbine system comprising:
   a compressor;
   an intake section comprising a filter house and an inlet duct, wherein the intake section is coupled to the compressor and the filter house is upstream from the inlet duct;
   one or more sensors disposed in the intake section;
   a processor configured to:
   receive sensor data from the one or more sensors, one or more filter degradation rates for one or more filtration stages of the filter house, or some combination thereof;
   predict a compressor degradation rate for the compressor using a compressor degradation prediction model that provides a function of performance of the compressor based on the sensor data, the one or more filter degradation rates, or some combination thereof; and
   perform one or more preventative actions based on the compressor degradation rate prediction.

2. The turbine system of claim 1, wherein the one or more filter degradation rates are determined by a filter degradation prediction model.

3. The turbine system of claim 1, wherein the one or more preventative actions comprise scheduling an online water wash of the compressor, an offline water wash of the compressor, or both based on the compressor degradation rate prediction.

4. The turbine system of claim 1, wherein the one or more sensors comprise:
   one or more dust sensors disposed upstream of the filter house, in the inlet duct, or some combination thereof;
   one or more pressure sensors disposed upstream of the filter house, in the filter house, downstream of the filter house, or some combination thereof;
   one or more temperature and humidity sensors disposed upstream of the compressor; or
   some combination thereof.

5. The turbine system of claim 1, wherein the sensor data comprises dust particle size, dust particle type, dust particle concentration, temperature, humidity, mass flow rate, or some combination thereof.

6. The turbine system of claim 1, wherein the sensor data comprises trending historical dust particle data that bypasses the filter house and enters the inlet duct over time as the turbine system operates, and the trending historical dust particle data comprises dust particle size, dust particle type, dust particle concentration, or some combination thereof.

7. The turbine system of claim 1, wherein the compressor degradation prediction model is adapted in real-time by including new sensor data, new filter degradation rates, or some combination thereof over time as the turbine system operates.

8. The turbine system of claim 1, wherein the one or more preventative actions comprise displaying the compressor degradation rate prediction, a remaining useful life of the compressor based on the compressor degradation rate prediction, or both.

9. The turbine system of claim 1, wherein the processor receives information related to operation modes of the turbine system, load and efficiency of the turbine system, whether inlet bleed heat is active, power augmentation measures, or some combination thereof.

10. A computer-implemented method, comprising:
    receiving one or more filter degradation rates for one or more filtration stages of a filter house in an intake section of a turbine system, sensor data from one or more sensors of the turbine system, or some combination thereof;
    predicting a compressor degradation rate for the compressor using a compressor degradation prediction model that provides a function of performance of the compressor based on the sensor data, the one or more filter degradation rates, or some combination thereof; and performing one or more preventative actions based on the compressor degradation rate prediction.

11. The computer-implemented method of claim 10, wherein the one or more preventative actions comprise generating a schedule of one or more online water washes of a compressor, one or more offline water washes of the compressor, or both based on the compressor degradation rate prediction, and performing the schedule.

12. The computer-implemented method of claim 10, wherein the one or more filter degradation rates are determined by a filter degradation prediction model.

13. The computer-implemented method of claim 10, wherein the sensor data comprises dust particle size, dust particle type, dust particle concentration, temperature, humidity, mass flow rate, or some combination thereof.

14. The computer-implemented method of claim 10, comprising generating the compressor degradation rate prediction in real-time as conditions of the turbine system change during operation as indicated by the sensor data.

15. The computer-implemented method of claim 10, wherein the one or more sensors comprise:
one or more dust sensors disposed upstream of the filter house, in an inlet duct downstream from the filter house, or some combination thereof;
one or more pressure sensors disposed upstream of the filter house, in the filter house, downstream of the filter house, or some combination thereof;
one or more temperature and humidity sensors disposed upstream of a compressor; or
some combination thereof.

16. The computer-implemented method of claim 10, wherein the sensor data comprises trending historical dust particle data that bypasses the filter house and enters an inlet duct in between the filter house and a compressor over time as the turbine system operates, and the trending historical dust particle data comprises dust particle size, dust particle type, dust particle concentration, or some combination thereof.

17. One or more tangible, non-transitory, computer-readable media storing computer instructions that, when executed by one or more processors, cause the one or more processors to:
receive one or more filter degradation rates for one or more filtration stages of a filter house in an intake section of a turbine system, sensor data from one or more sensors of the turbine system, or some combination thereof;
predict a compressor degradation rate for the compressor using a compressor degradation prediction model that provides a function of performance of the compressor based on the sensor data, the one or more filter degradation rates, or some combination thereof; and
perform one or more preventative actions based on the compressor degradation rate prediction.

18. The one or more computer-readable media of claim 17, wherein the one or more preventative actions comprises generating a schedule of one or more online water washes of a compressor, one or more offline water washes of the compressor, or both based on the compressor degradation rate prediction, and performing the schedule.

19. The one or more computer-readable media of claim 17, wherein the computer instructions, when executed by the one or more processors, cause the one or more processors to validate the compressor degradation rate prediction at a later time using subsequent sensor data.

20. The one or more computer-readable media of claim 17, wherein performing the one or more preventative actions based on the compressor degradation rate prediction increases efficiency of the turbine system.

* * * * *